UNITED STATES PATENT OFFICE.

BLAISE KIEFFER, OF PITTSBURGH, PENNSYLVANIA.

METHOD OF HARDENING COPPER.

1,359,810.   Specification of Letters Patent.   Patented Nov. 23, 1920.

No Drawing.   Application filed February 2, 1920. Serial No. 355,733.

*To all whom it may concern:*

Be it known that I, BLAISE KIEFFER, a resident of Pittsburgh, in the county of Allegheny and State of Pennsylvania, have invented a new and useful Improvement in Methods of Hardening Copper, of which the following is a specification.

This invention has for its object to harden or temper copper.

The art of hardening or tempering copper was known to the ancient Egyptians, but has become a lost art. Specimens of Egyptian copper having a decided temper have been discovered, but up to the present time no one has been able to reproduce such hardened copper. I have discovered a method by means of which copper can be practically and commercially hardened or tempered to a degree equal to that of the old Egyptian specimens.

In carrying out the method the piece of copper is heated in a furnace in which the heat is very carefully regulated or in any suitable way to a temperature just below the point at which copper melts and for such length of time as to cause the heat to soak or penetrate entirely through the piece. The hot piece is then immediately covered or coated in any suitable way with pulverized or granulated glass, or its equivalent, the pulverized or granulated glass being made to cover the entire outer surface of the copper, or at least so much of the surface of the copper piece as is to be hardened. The coated copper piece is then quickly cooled, such as by plunging it into water. Copper thus treated will be found to be hard throughout the mass, and capable of being put to many uses where soft copper is not applicable.

Any kind of furnace or any kind of fuel can be used. The furnace should have a smooth clean bottom on which the copper rests while being heated. The heat must be very carefully regulated, so as not to burn or melt the copper, but nevertheless heat it high enough to heat the copper throughout the mass to a temperature only slightly below its melting point.

The glass or its equivalent must be in a finely divided state, ranging from the fineness of flour to small grains like sugar. The smaller the piece the finer the glass should be ground. It can be applied in any suitable way, such as by rolling the copper piece in the powdered glass, or drawing it through the powdered glass, or by covering it with the powdered glass. The heat of the piece causes the powdered glass to adhere thereto. Care must be taken to have the powdered glass cover the entire surface of the piece, or at least so much of the surface of the piece as is to be hardened. If the powdered glass does not completely cover the copper piece, the piece can be returned to the furnace to cause the adhering glass to melt and flow over its entire surface. The copper having been coated with powdered glass should be allowed to cool appreciably, but quickly cooled as above described.

The length of time the copper is heated depends upon the size of the piece and also somewhat upon the temperature in the furnace. In general, the larger the piece the longer must the heat be applied. For hardening long pieces, such as copper rods or wire, a continuous process can be employed. That is to say, the copper wire or rod can be drawn slowly through a furnace in which the required temperature is maintained, and as it comes out of the furnace drawn through a mass of powdered glass, and then immediately passed through or into a water bath for cooling it.

Copper treated in the manner above described is very hard, considerably harder than a soft steel. In case a single treatment does not make the copper sufficiently hard, the treatment can be repeated one or more times, until the required hardness is secured. This hardened copper is capable of being machined and worked in the same way that steel is machined and worked, and can be hammered down, when cold to various shapes. It can be formed into various articles, and can even be sharpened to form a cutting edge.

Such hardened copper has a variety of uses in the industries.

I claim:—

The method of hardening copper which consists in heating copper to a temperature somewhat below its melting point, applying to its surface glass in a finely divided state, and then quickly cooling the same.

In testimony whereof, I have hereunto set my hand.

BLAISE KIEFFER.

Witness:
   G. G. TRIEL.